United States Patent
Risse

(10) Patent No.: US 9,151,402 B2
(45) Date of Patent: Oct. 6, 2015

(54) CYLINDER VALVE HAVING A DEVICE FOR REDUCING OR CLOSING OFF THE FLOW IN THE EVENT OF A RISE IN TEMPERATURE

(75) Inventor: Claude Risse, Bertrange (FR)

(73) Assignee: Luxembourg Patent Company S.A., Luxembourg (LU)

( * ) Notice: Subject to any disclaimer, the term of this patent is extended or adjusted under 35 U.S.C. 154(b) by 0 days.

(21) Appl. No.: 14/003,696

(22) PCT Filed: Feb. 29, 2012

(86) PCT No.: PCT/EP2012/053435
§ 371 (c)(1),
(2), (4) Date: Sep. 26, 2013

(87) PCT Pub. No.: WO2012/119901
PCT Pub. Date: Sep. 13, 2012

(65) Prior Publication Data
US 2014/0053921 A1    Feb. 27, 2014

(30) Foreign Application Priority Data
Mar. 7, 2011  (LU) .......................................... 91795

(51) Int. Cl.
*F16K 17/38*  (2006.01)
*F16K 1/30*  (2006.01)
(Continued)

(52) U.S. Cl.
CPC ................. *F16K 17/38* (2013.01); *F16K 1/304* (2013.01); *F16K 1/307* (2013.01); *F16K 31/002* (2013.01);
(Continued)

(58) Field of Classification Search
CPC ..... F16K 17/38; F16K 17/386; F16K 17/383; F16K 1/304; F16K 1/307; F16K 31/002; G05D 23/02; G05D 23/022; F17C 13/04; F17C 13/026; F17C 13/123; F17C 2205/0323; F17C 2205/0382; F17C 2205/0385; F17C 2205/0394; F17C 2221/011; F17C 2221/017; F17C 2223/0123; F17C 2223/036; F17C 2250/0439; F17C 2250/0636; F17C 2260/042; F17C 2270/025; Y10T 137/7737
USPC ............ 137/468, 457, 67; 251/11; 236/101 R
See application file for complete search history.

(56) References Cited

U.S. PATENT DOCUMENTS 2,820,473 A * 1/1958 Reiners ......................... 137/468
4,457,327 A * 7/1984 Pepper ............................ 137/67
(Continued)

FOREIGN PATENT DOCUMENTS

EP    0668468 A1    8/1995
EP    1500854 A1    1/2005

OTHER PUBLICATIONS

International Search Report from corresponding International Application No. PCT/EP2012/053435, mailed Apr. 19, 2012 (English Translation included).

*Primary Examiner* — Jessica Cahill
(74) *Attorney, Agent, or Firm* — Polster Lieder

(57) ABSTRACT

A cylinder valve for pressurized gas with a body including a gas inlet, a gas outlet and a passage connecting the inlet to the outlet. The valve also includes a closing/opening valve, a pressure reducer and a device for reducing or closing the gas passage between said valve and a pressure reducer. The device includes an element that is made of shape-memory alloy and positioned in a cavity of the passage. The element includes an active deformable portion, the circular outer edge of which is capable of engaging with the inner surface of the cavity in order to close the passage following a rise in temperature caused by combustion. The combustion can be generated by adiabatic compression during the opening of the valve.

20 Claims, 2 Drawing Sheets

(51) Int. Cl.
*F16K 31/00* (2006.01)
*F17C 13/02* (2006.01)
*F17C 13/04* (2006.01)
*F17C 13/12* (2006.01)

(52) U.S. Cl.
CPC .............. *F17C 13/026* (2013.01); *F17C 13/04* (2013.01); *F17C 13/123* (2013.01); *F17C 2205/0323* (2013.01); *F17C 2205/0382* (2013.01); *F17C 2205/0385* (2013.01); *F17C 2205/0394* (2013.01); *F17C 2221/011* (2013.01); *F17C 2221/017* (2013.01); *F17C 2223/0123* (2013.01); *F17C 2223/036* (2013.01); *F17C 2250/0439* (2013.01); *F17C 2250/0636* (2013.01); *F17C 2260/042* (2013.01); *F17C 2270/025* (2013.01); *Y10T 137/7737* (2015.04)

(56) References Cited

U.S. PATENT DOCUMENTS

| | | | |
|---|---|---|---|
| 5,014,520 A * | 5/1991 | Orner et al. | 62/187 |
| 5,127,436 A * | 7/1992 | Campion et al. | 137/614.11 |
| 5,967,409 A * | 10/1999 | Benedict | 236/92 R |
| 6,102,897 A * | 8/2000 | Lang | 604/246 |
| 7,225,810 B2 | 6/2007 | Kikuchi | |
| 7,530,466 B2 * | 5/2009 | Spinelli et al. | 220/201 |
| 2003/0010949 A1 * | 1/2003 | Ito | 251/11 |
| 2003/0127413 A1 | 7/2003 | Spinelli et al. | |
| 2005/0145284 A1 * | 7/2005 | Sarajian et al. | 137/854 |
| 2010/0078081 A1 * | 4/2010 | McKee | 137/468 |
| 2010/0224267 A1 * | 9/2010 | Flomenblit et al. | 137/468 |

* cited by examiner

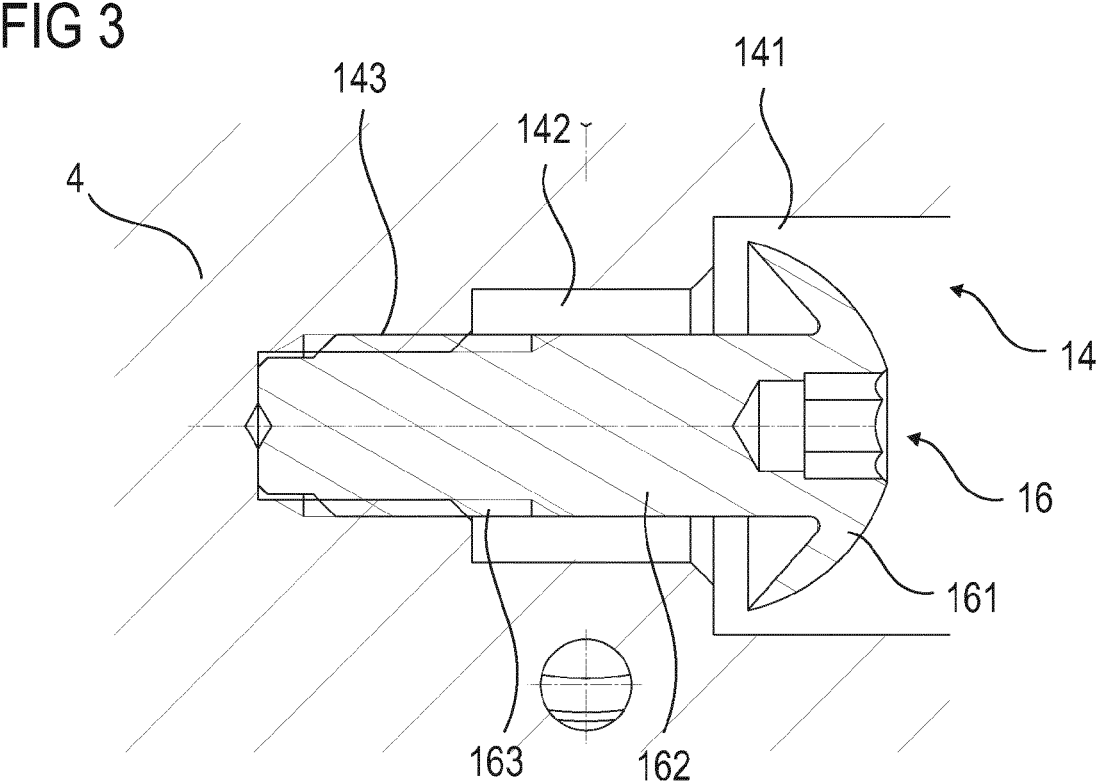
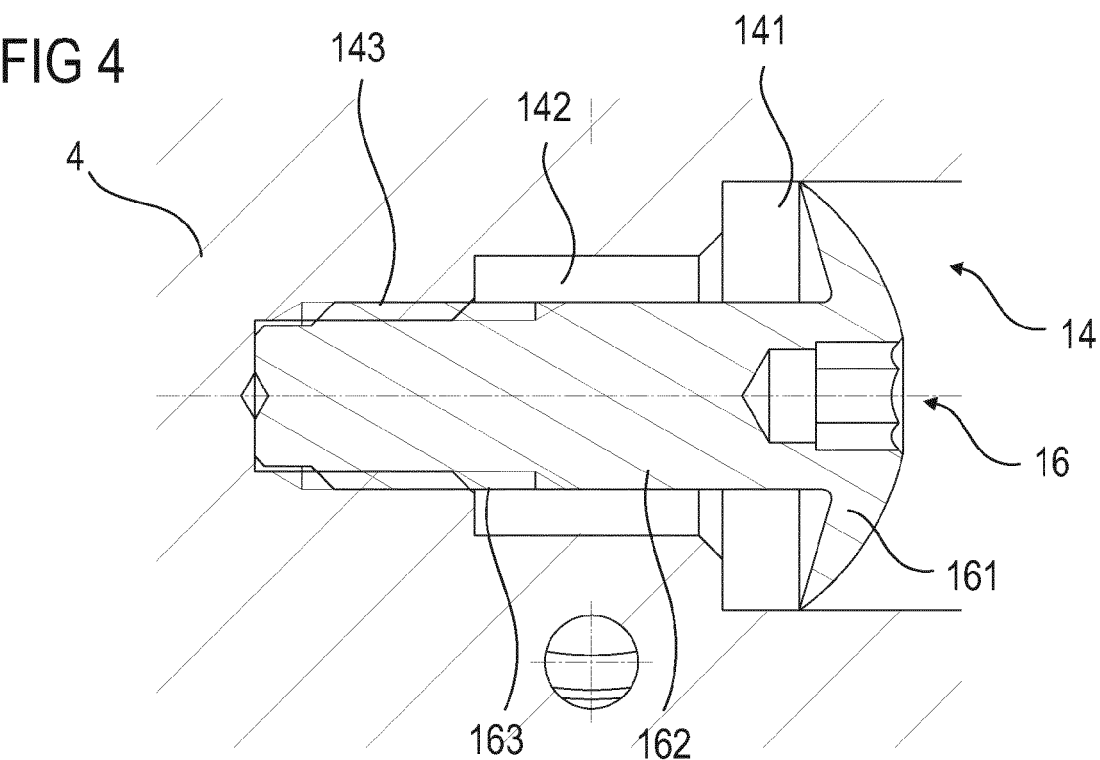

CYLINDER VALVE HAVING A DEVICE FOR REDUCING OR CLOSING OFF THE FLOW IN THE EVENT OF A RISE IN TEMPERATURE

CROSS-REFERENCE TO RELATED APPLICATIONS

The present invention is the US national stage under 35 U.S.C. §371 of International Application No. PCT/EP2012/053435, which was filed on Feb. 29, 2012 and which claims the priority of application LU 91795 filed on Mar. 7, 2011 the content of which (text, drawings and claims) is incorporated here by reference in its entirety.

FIELD

The invention relates to a tap for a pressurized gas container. More precisely, the invention relates to a tap for a pressurized gas container fitted with a shut-off valve. While the invention is appropriate for applications involving various types of gases, it is particularly suitable for oxidizing gases sensitive to adiabatic compression, more particularly for oxygen applications.

BACKGROUND

The speeds involved in a tap for a high pressure (above 200 bar) gas container are very high. For gases such as helium the speeds can be much greater than the speed of sound. With such speeds some plastic seats or inserts in the regulator valve cannot resist the adiabatic compression shock and can burn in the presence of an oxidizing gas. It is therefore useful to restrict the pressure and slow the speed of the gas to absorb the shock wave when opening the main valve of the tap for withdrawing gas.

In the prior art, filters were provided between the main valve and the regulator valve, but these filters have the disadvantage of slowing the gas flow when the container is nearly empty. In addition, filters can become clogged. As a result, they suffer shocks every time they are opened and can generate particles. At high pressure, which can be of the order of 300 bars or more, when the gas cylinder is full, known filters pose no problems and do not interfere with the flow. However, filters cause a constant pressure drop, and at low pressures, below 50 bars, pressure disturbances begin and become particularly detrimental at 10 bars. These known filters that cause a constant pressure drop therefore choke the gas expansion curve at low pressure.

Other, less damaging, solutions have been developed for when the container pressure decreases.

For example, Patent EP 1500854 A1 discloses a container tap provided with a non-sealing shutter located between an on/off valve and a regulator tap. The shutter is normally positioned across the flow area. When the valve is opened, the pressurized gas rapidly forces the shutter to a position across a restricted flow area so as to reduce the shock wave applied to the regulator valve. After the pressure equalizes across both sides of the shutter, the latter returns to its normal position across the full flow area.

U.S. Pat. No. 7,225,810 B2 discloses a container tap with a shutter similar to that in the previous document and operating in the same way.

These shutters certainly provide an interesting solution, however, they have the disadvantage of complexity linked to a reliability constraint, as well as a disadvantage in that they do not definitely prevent combustion when the valve is opened. Indeed, in the presence of impurities in the tap pathway and, especially in the presence of oxygen under high pressure, combustion can still occur and cause serious safety problems. Indeed, in the event of combustion, flames can escape from the tap and cause burns, damage to nearby equipment and/or cause fires.

SUMMARY

The invention aims to provide a container tap that overcomes at least one of the problems mentioned above. More particularly, the invention has the objective of proposing a container tap that reduces the risk of fire and burns when operating the tap, especially with strong oxidizing gases such as oxygen.

The invention relates to a tap for pressurized gas container, comprising a housing with a gas inlet, a gas outlet and a gas pathway connecting the inlet to the outlet, a shut-off valve for shutting off and/or reducing the gas path; wherein it further comprises a device for reducing or closing the path in response to a rise in temperature, the device being arranged in the housing downstream of the shut-off valve.

Such a tap is designed to operate at greater than or equal to 50 bars pressure, preferably to 100 bars, more preferably even at 200 bars.

According to an advantageous embodiment of the invention, the tap includes a regulator valve located downstream of the device for reducing or closing the passage, preferably in the tap housing. The regulator valve can be integrated into the tap body. The latter can consist of several assembled components.

According to another advantageous embodiment of the invention, the device for reducing or closing the passage is configured to reduce or close the gas flow when the temperature in the gas flow exceeds 100° C., preferably 120° C., more preferably 150° C.

According to a further advantageous embodiment of the invention, the device for reducing or closing the passage is mechanical. This device is indeed preferentially purely mechanical.

According to a further advantageous embodiment of the invention, the device for reducing or closing the passage comprises a shape memory alloy element that can be deformed when its temperature exceeds a preset level.

According to a further advantageous embodiment of the invention, the shape memory alloy element has a memory effect only when the temperature is raised.

According to a further advantageous embodiment of the invention, the device for reducing or closing the passage is configured so that the deformation of shape memory alloy element operates directly to reduce or close the passage.

According to yet another advantageous embodiment of the invention, the shape memory alloy element comprises a deformable portion with a circular edge designed to make contact with a fixed surface, preferably formed directly in the housing, so as to reduce or close the passage.

According to a further advantageous embodiment of the invention, the deformable portion of the shape memory alloy element is dome-shaped.

According to a further advantageous embodiment of the invention, the diameter of the circular edge increases when the temperature exceeds the preset level, preferably more than 10% above 100° C., 120° C. or even 150° C.

According to a further advantageous embodiment of the invention, the shape memory alloy element comprises a generally elongated part attached to the deformable portion, the generally elongated part ensuring the fixing of the element to the housing.

According to a further advantageous embodiment of the invention, the generally elongated portion comprises a male thread mating with a corresponding female thread in the housing.

According to a further advantageous embodiment of the invention, the device for reducing or closing the passage comprises a cylindrical cavity with a first region with a first diameter receiving the deformable portion of the shape memory alloy element and a second region with a second diameter inside the first and upstream of the first region, so that the gas must flow around the circular outer edge of the dome-shaped part.

According to yet another advantageous embodiment of the invention, the deformable part of the shape memory alloy element is dome-shaped with a circular outer edge, located in the cavity so that the hollow of the dome is directed towards the second region of the cavity.

According to yet another advantageous embodiment of the invention, the cavity comprises a third region adjacent to the first region and opposite to the first, with a means for fixing the shape memory alloy element, preferably by a female thread.

The invention can take advantage of the increase in temperature caused by combustion when the on/off valve is opened, so to ensure closure or at least an automatic quasi-closure in a very short time. Given the fact that combustion in such a tap cannot be excluded, even in the presence of devices such as those described in the "Prior Art" section, the tap in the invention provides a significant safety advantage.

The use of one (or more) shape memory alloy elements enables the response time to be very short and, above all, compatible with a very oxidizing gas under very high pressure, such as oxygen. Indeed, automatic gas flow closure systems involving a fuse element are known, including anti-blowback functions in welding torches. Such a solution is obviously not applicable to a container tap where oxygen at a pressure of about 200 bars predominates.

Furthermore, the fact of using one (or more) shape memory alloy elements with an edge designed to come into direct contact with a fixed surface so as to close off or reduce the passage is particularly interesting both because it is easy to implement as well as being reliable.

DRAWINGS

FIG. 3 is a sectional view of the tap closure device in the event of a temperature rise in the tap of FIG. 1, albeit with another design of shape memory alloy element, the device being in the open position, according to various embodiments of the invention.

FIG. 4 is a sectional view of the tap closure device in the event of a temperature rise in the tap of FIG. 1, albeit with another design of shape memory alloy element, the device being in the closed position, according to various embodiments of the invention.

DETAILED DESCRIPTION

Figure 1:
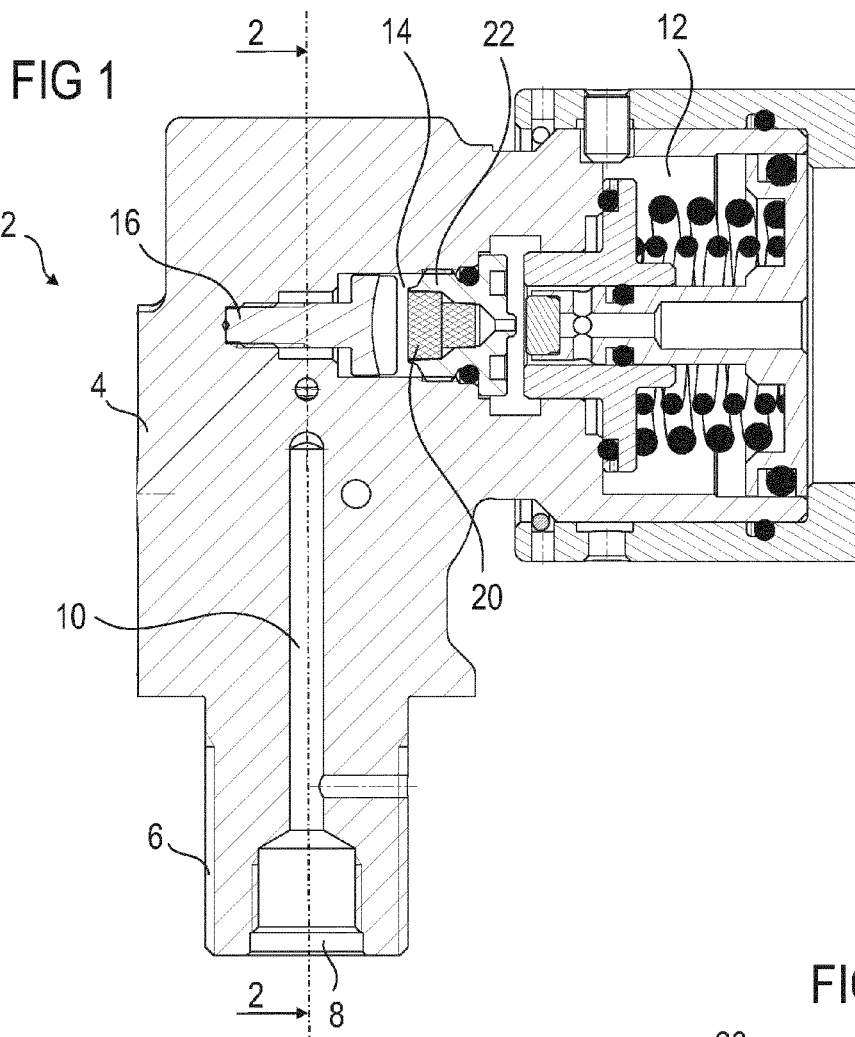
FIG. 1 is a plan view of a container tap according to various embodiments of the invention.

The container tap 2 for pressurized gas comprises a housing 4 with a gas inlet 8, an outlet (not shown) and a passage 10 connecting the inlet 8 to the outlet. The housing 4 comprises a male thread 6 to be screwed onto the neck of a gas cylinder.

Figure 2:
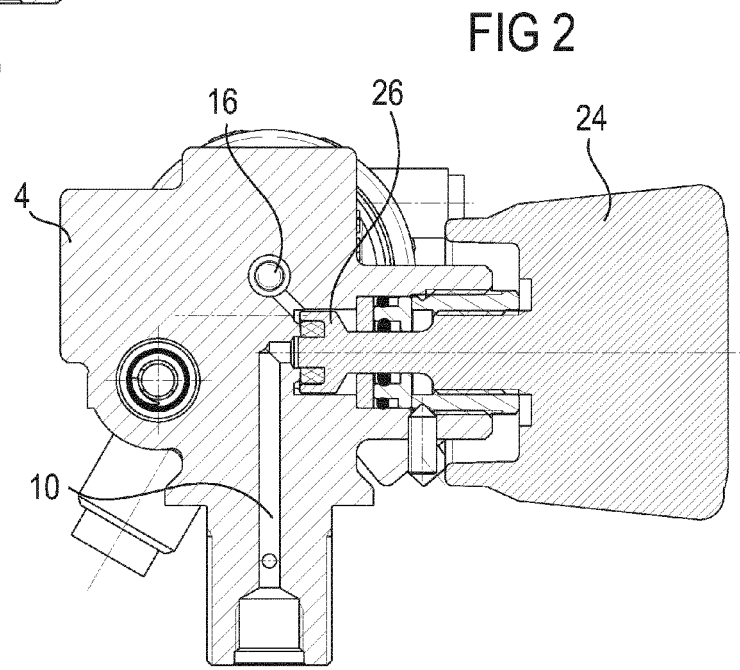
FIG. 2 is a sectional view of the shell of the tap in FIG. 1, sectioned at 2-2, according to various embodiments of the invention.

The tap 2 further comprises a shut-off valve 26 illustrated in FIG. 2. The latter is a sectional view of the tap 2 in FIG. 1, sectioned at 2-2. The duct, or passage, 10 for the passage of gas can also be seen. The shut-off valve 26 comprises an element movable in translation and rotation, and provided with a sealing ring mating with a seat formed in the valve housing. This movable element is actuated by a hand wheel 24 accessible from the outside of the valve 26 and located on the side of the housing.

Downstream of the on/off valve 26 is a device which is arranged to close the passage 10 of gas when the temperature exceeds a critical threshold. This device comprises a chamber, or cavity, 14 and a shape memory alloy element 16. The shape memory alloy element 16 includes a head portion capable of changing its shape significantly. More particularly, the head of the shape memory alloy element 16 comprises a circular outer edge designed to change its size in order to seal with the cavity 14 in which it is housed. In the event that the temperature of the head of the shape memory alloy element 16 rises beyond a critical level, it will change shape so that the diameter of its outer edge increases so that it comes into contact with the inner surface of the cavity 14 and automatically closes off the gas passage 10.

In FIG. 1 the shape memory alloy element 16 is in the closed position, that is to say the outer edge of that part of it intended to make contact with the cavity 14 forms a seal with the cavity 14.

Shape memory alloys (SMA) are among alloys with several new properties among metallic materials: the ability to remember an initial form and return to it even after deformation; the ability to switch between two previously stored forms when the temperature varies around a critical temperature; and a super-elastic behaviour allowing elastic elongations greater than those of other metals. Among the main shape memory alloys there are a variety of nickel and titanium alloys as the main components in approximately equal proportions. Although "nitinol" ("Nickel-Titanium Naval Ordnance Laboratory") is actually the name of one of these "quasi-equiatomic nickel-titanium" alloys this name has become commonly used in the literature to describe all of these alloys, which have very similar properties. To a lesser extent some brass and copper-aluminium alloys also have shape memory properties.

The active portion, in this case the head of the shape memory alloy element 16 is designed to deform so that the diameter of its outer edge increases by at least 5%, preferably 10%, more preferably 15%. Such super-elastic behaviour enabling elastic elongations can be achieved by a judicious choice of materials and suitable design of the active part of the element. The critical temperature can vary depending on the choice of material. In the case of container taps, which typically operate at ambient temperatures of between 0° C. and 30° C., the critical threshold will be set, at least approximately, to about 100° C., 120° C. or even 150° C. The closure valve must remain open over a broad temperature range, such as between −40° C. and +70° C. to cover the temperature extremes in which the valve is likely to need to function normally.

Particularly in the case of oxygen and when opening the tap's on/off valve 26, the pressurization of the gas passage between the valve 26 and the regulator valve 12 can give rise to transient adiabatic compression, generating temperature increases and initiating combustion inside the valve housing. Such combustion can be made possible by the presence of residues or impurities in the valve.

In the event of combustion, flames can escape from the tap 2, particularly because of the large flow of oxygen. The presence of a self-closing device or, at least, one that reduces the gas flow to the tap 2 provides a certain degree of safety in this problem area that, up till now, has had no real solution. Indeed, in the event of combustion starting when the valve 26 is opened, the shape memory alloy element 16 will quickly heat up and exceed the critical threshold. It will then, in a very short time directly linked to its thermal inertia, deform and come into contact with the inner wall of the cavity 14. This contact closes off the passage of the gas, in this case oxygen, and thus stops the flames.

It should be noted that the contact between the outer edge of the active part of the shape memory alloy element 16 and the inner surface of the cavity 14 cannot be made completely gas-tight, especially in terms of the surface state of the active part and the state of the corresponding internal surface of the cavity 14. The device can therefore be a device for reducing or decreasing the gas flow but not a device for closing it off completely.

The cavity 14 discharges upstream into a filter 20 located in a fitting 22. The gas passing through the cavity 14 will therefore meet a first pressure drop generator from the narrowing formed by the filter 20 and a second narrowing directly downstream at the regulator valve seat. The pressure drops created by these elements will increase the shock wave in the gas when the on/off valve 26 is opened. This shock wave will be created in the cavity 14. Positioning the active part of the closure device in this cavity 14 and adjacent to the filter 20 and the regulator valve seat allows the response time of the device to be minimized and, thus, its effectiveness is increased.

With reference to the point made earlier about a device reducing the flow area, it should be noted that, depending on the application and its parameters, such a device significantly reducing this, for example by least 70%, preferably 80%, still more preferably 90%, the flow area could also increase the safety of the tap 2 by limiting, in a known manner, the propagation of flames outside the tap 2.

FIG. 3 illustrates the closure device of FIG. 1, albeit with a design of shape memory alloy element 16 that differs at the active part or head of the element 16. In such embodiment, the shape memory alloy element 16 includes a first active domed portion 161 and a second generally cylindrical portion 162. The cavity 14 is generally cylindrical with a first region 141 of a fixed first diameter and wherein the active portion 161 of the element is located. The cavity 14 also includes a second region 142 immediately adjacent to the first region and in fluid connection therewith. The second region 142 has a smaller diameter than the first region 141. The dome-shaped portion 161 of element 16 is oriented so that its open end faces the second region 142 of the cavity 14. The cavity 14 is supplied with gas radially at the second region 142. The gas thus flows bypassing the rear portion and the outer edge of the dome-shaped portion.

The cylindrical portion 162 of element 16 ends with a male thread 163 inserted into a female thread formed in a third region 143 of the cavity 14. The three regions 141, 142 and 143 of the cavity 14 are concentric.

When the on/off valve 26 is opened, in the event of combustion caused by the adiabatic shock wave, the temperature in the first region 141 of the cavity 14 will increase. The temperature of the active domed part 161 of element 16 will increase and will deform to take the shape shown in FIG. 4. The dome 161 is flattened and has increased its outer diameter so as to be in contact with the inner surface of the cavity 14. This super-elastic deformation thus enables the passage of gas to be stopped and the combustion to be stopped dead. Further, because the umbrella or dome shape of this part, oriented so that its hollow is on the upstream side of the gas flow, allows this part to deform even further in the direction of closure from the effect of the shock wave triggered by its deformation.

Note that the shape memory alloy elements shown in FIGS. 1, 3 and 4 are purely examples. They can take many forms other than those shown.

The invention claimed is:

1. A pressurized gas container tap, comprising a housing with a gas inlet, a gas outlet and a passage connecting the inlet to the outlet;
a shut-off and opening valve in the gas passage; and
a device for at least one of reducing and closing the passage in response to an increase in temperature, the device being located in the housing downstream of the shut-off and opening valve, the device for at least one of reducing and closing the passage comprising:
a shape memory alloy element structured and operable to deform when a temperature of the device exceeds a preset level, the shape memory alloy element comprising:
a deformable portion with a circular peripheral outer edge structured and operable to make a direct contact with a fixed cylindrical surface surrounding the deformable portion so as to at least one of reduce and close the passage.

2. The container tap in accordance with claim 1, wherein the device for at least one of reducing and closing the passage is configured to at least one of reduce and close the gas flow when the temperature in the gas flow exceeds 100° C.

3. The container tap in accordance with claim 1, wherein the device for at least one of reducing and closing the passage is configured to at least one of reduce and close the gas flow when the temperature in the gas flow exceeds 120° C.

4. The container tap in accordance with claim 1, wherein the device for at least one of reducing and closing the passage is configured to at least one of reduce and close the gas flow when the temperature in the gas flow exceeds 150° C.

5. The container tap according to claim 1, wherein the device for at least one of reducing and closing the passage is mechanical.

6. The container tap in accordance with claim 1, wherein the shape memory alloy element has a memory effect only when the temperature is raised.

7. The container tap in accordance with claim 1, wherein the device for at least one of reducing and closing the passage is configured so that the deformation of shape memory alloy element operates directly to at least one of reduce and close the passage.

8. The container tap in accordance with claim 1, wherein the fixed surface is formed directly in the housing.

9. The container tap in accordance with claim 1, wherein the deformable portion of the shape memory alloy element has the general shape of a dome.

10. The container tap in accordance with claim 1, wherein the diameter of the circular edge increases when the temperature exceeds the preset level that is more than 10% above 100° C.

11. The container tap in accordance with claim 1, wherein the diameter of the circular edge increases when the temperature exceeds the preset level that is more than 10% above 120° C.

12. The container tap in accordance with claim 1, wherein the diameter of the circular edge increases when the temperature exceeds the preset level that is more than 10% above 150° C.

13. The container tap in accordance with claim 1, further comprising a pressure regulator valve located downstream of the device for at least one of reducing and closing the passage.

14. The container tap in accordance with claim 13, wherein the pressure regulator is located in the tap housing.

15. The container tap in accordance with claim 1, wherein the shape memory alloy element comprises a generally elongated part attached to the deformable portion, the generally elongated part ensuring the fixing of the element to the housing.

16. The container tap in accordance with claim 15, wherein the generally elongated portion comprises a male thread mating with a corresponding female thread in the housing.

17. The container tap in accordance with claim 1, wherein the device for at least one of reducing and closing the passage comprises a cylindrical cavity with a first region with a first diameter receiving the deformable portion of the shape memory alloy and a second region with a second diameter smaller than the first diameter and upstream of the first region, so that the gas must flow around the circular outer edge of the dome-shaped part.

18. The container tap in accordance with claim 17, wherein the deformable part of the shape memory alloy element is dome-shaped with a circular outer edge, disposed in the cavity so that a hollow of the dome is directed towards the second region of the cavity.

19. The container tap in accordance with claim 17, wherein the cavity comprises a third region adjacent to the first region and opposite to the first, with a means for fixing the shape memory alloy element.

20. The container tap in accordance with claim 19, wherein the means for fixing the shape memory alloy element comprises a female thread.

* * * * *